(12) United States Patent
Zheng et al.

(10) Patent No.: US 12,014,651 B2
(45) Date of Patent: Jun. 18, 2024

(54) PERFUSIVE TISSUE PHANTOM

(71) Applicant: Nokia Technologies Oy, Espoo (FI)

(72) Inventors: Mingde Zheng, Basking Ridge, NJ (US); Shreyas Shah, Dayton, NJ (US)

(73) Assignee: Nokia Technologies Oy, Espoo (FI)

( * ) Notice: Subject to any disclaimer, the term of this patent is extended or adjusted under 35 U.S.C. 154(b) by 494 days.

(21) Appl. No.: 17/349,279

(22) Filed: Jun. 16, 2021

(65) Prior Publication Data
US 2022/0406222 A1 Dec. 22, 2022

(51) Int. Cl.
*G09B 23/30* (2006.01)
*G01N 27/08* (2006.01)
*G09B 23/34* (2006.01)

(52) U.S. Cl.
CPC .......... *G09B 23/303* (2013.01); *G01N 27/08* (2013.01); *G09B 23/34* (2013.01)

(58) Field of Classification Search
CPC ...... G09B 23/28; G09B 23/285; G09B 23/30; G09B 23/303
See application file for complete search history.

(56) References Cited

U.S. PATENT DOCUMENTS

| | | | | |
|---|---|---|---|---|
| 5,775,916 A * | 7/1998 | Cooper | ............... | G09B 23/28 434/272 |
| 7,507,092 B2 * | 3/2009 | Sakezles | ............... | G09B 23/28 434/267 |
| 7,569,809 B2 | 8/2009 | Vija et al. | | |
| 8,480,407 B2 * | 7/2013 | Campbell | ............... | G09B 23/28 434/272 |
| 8,568,147 B2 | 10/2013 | Kuo et al. | | |
| 10,360,813 B2 * | 7/2019 | Okayama | ............... | F04B 53/16 |
| 10,847,057 B2 * | 11/2020 | Felsinger | ............... | G09B 23/30 |
| 11,417,242 B2 * | 8/2022 | Takahashi | ............... | G09B 23/285 |
| 2005/0202381 A1 * | 9/2005 | Keegan | ............... | G09B 23/286 434/262 |

(Continued)

FOREIGN PATENT DOCUMENTS

| | | |
|---|---|---|
| EP | 3593708 A1 | 1/2020 |
| WO | 2016/141153 A1 | 9/2016 |

OTHER PUBLICATIONS

Cho et al., "A Versatile Flow Phantom for Intravoxel IncoherentMotion MRI", Magnetic Resonance in Medicine, vol. 67, 2012, pp. 1710-1720.

(Continued)

*Primary Examiner* — Kurt Fernstrom
(74) *Attorney, Agent, or Firm* — Nokia Technologies Oy (57) ABSTRACT

A perfusive tissue phantom is disclosed. An example tissue phantom includes a chamber with fluid inlets disposed on a first side and fluid outlets disposed on a second side spaced apart from the first side. The tissue phantom also includes a hydrogel region connected to at least one of the fluid inlets and including a permeable hydrogel with structural characteristics that simulate a type of tissue. The tissue phantom also includes a microfluidic conduit coupled to at least one of the fluid inlets. The microfluidic conduit is a flexible, semi-permeable fiber that simulates a blood vessel. The structural characteristics of the permeable hydrogel may include a selected density, porosity, rigidity and dimension that approximate a target density, porosity, rigidity and dimension of interstitial space of the type of tissue.

20 Claims, 4 Drawing Sheets

(56) References Cited

U.S. PATENT DOCUMENTS

| 2010/0196867 | A1* | 8/2010 | Geerligs | G09B 23/28 |
| | | | | 434/272 |
| 2016/0130543 | A1 | 5/2016 | Daniele et al. | |
| 2017/0067882 | A1 | 3/2017 | Bornhop et al. | |
| 2020/0152091 | A1* | 5/2020 | Haga | G09B 23/285 |
| 2021/0041853 | A1 | 2/2021 | Serpooshan et al. | |
| 2022/0036765 | A1* | 2/2022 | Pallister | G09B 23/34 |

OTHER PUBLICATIONS

Komlosh et al., "A Novel MRI Phantom to Study Interstitial Fluid Transport in the Glymphatic System", Magnetic Resonance Imaging, vol. 56, 2019, pp. 181-186.

Kingsmore et al., "MRI Analysis to Map Interstitial Flow in the Brain Tumor Microenvironment", APL Bioeng., vol. 2, 031905, 2018, 16 pages.

Chen et al., "Preparation of a Skin Equivalent Phantom with Interior Micron-scale Vessel Structures for Optical ImagingExperiments", Biomedical Optics Express, vol. 5, No. 9, Aug. 22, 2014, pp. 3140-3149.

Chen et al., "Fabrication of a Turbid Optofluidic Phantom Device with Tunable μa and μ's to Simulate Cutaneous Vascular Perfusion", Scientific Reports, vol. 6, Article No. 30567, 2016, pp. 1-12.

Shah et al., "Microparticle-based Biochemical Sensing Using Optical Coherence Tomography and Deep Learning", bioRxiv, Dec. 22, 2020, pp. 1-25.

Zhao et al., "A Multiscale Computational Fluid Dynamics Approach to Simulate the Micro-fluidic Environment within a Tissue Engineering Scaffold with Highly rregular Pore Geometry", Biomechanics and Modeling in Mechanobiology, vol. 18, Jun. 14, 2019, pp. 1965-1977.

Wang et al., "An Artificial Blood Vessel Implanted Three-dimensional Microsystem for Modeling Transvascular Migration of Tumor Cells", Lab on a Chip, Accepted Manuscript, 2014, 11 pages.

Abalymov et al., "Polymer- and Hybrid-Based Biomaterials for Interstitial, Connective, Vascular, Nerve, Visceral and Musculoskeletal Tissue Engineering", Polymers, vol. 12, No. 3, 2020, pp. 1-30.

* cited by examiner

PERFUSIVE TISSUE PHANTOM

TECHNOLOGICAL FIELD

Example embodiments relate to a perfusive tissue phantom and techniques for fabricating a perfusive tissue phantom.

BACKGROUND

The human body is a source of a vast array of biological signals that are important indicators of overall health and well-being. Many advances in human healthcare are due to innovative methods that have been developed to measure these diverse signals. Due to advances in wearable technologies over the last decade, measuring vital signs (e.g. heart rate, body temperature, respiration rate, blood pressure) is now commonplace in the comforts of our homes. However, tapping into the rich in-body biochemistry for continuous monitoring, which can provide a much more accurate readout of an individual's health and well-being, has proven to be much more challenging. Currently, the presence and levels of specific biochemicals is primarily measured in vitro, by taking samples from an individual (e.g. blood, urine, biopsy, etc.) and analyzing it in a laboratory. While laboratory testing is still the current gold standard, there is a recent push towards the development of methods to conduct continuous in vivo biochemical monitoring via sensors. The development of such methods involves significant experimentation and testing. However, there are significant technical and financial hurdles with testing such sensors directly in humans. Accordingly, biomimics have become an important and emerging field of research in clinical, biomedical, and life science studies. Biomimics research aims to create biologically compatible replicas that simulate key functions of the tissue (often human) under investigation. Without these mimics, the alternative is invasive interventions such as in vivo experimentation directly on the human body or in vivo tissue.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various embodiments there is provided a perfusive tissue phantom. The tissue phantom includes a chamber with fluid inlets disposed on a first side and fluid outlets disposed on a second side spaced apart from the first side. The tissue phantom also includes a hydrogel region connected to at least one of the fluid inlets and including a permeable hydrogel with structural characteristics that simulate a type of tissue. The tissue phantom also includes a microfluidic conduit coupled to at least one of the fluid inlets. The microfluidic conduit is a flexible, semi-permeable fiber that simulates a blood vessel. The structural characteristics of the permeable hydrogel may include a selected density, porosity, rigidity and dimension that approximate a target density, porosity, rigidity and dimension of interstitial space of the type of tissue.

The hydrogel region may be a first hydrogel region, and the perfusive tissue phantom may include a second hydrogel region comprising a second permeable hydrogel with second structural characteristics that simulate a second type of tissue with different structural characteristics compared to the first hydrogel region. The second hydrogel region may be connected to at least a different one of the fluid inlets compared to the first hydrogel region. The spacing between the fluid inlets can be configured to control a degree of fluid interaction between the first hydrogel region and the second hydrogel region.

The perfusive tissue phantom can also include a localized environment constructed within the hydrogel region at a selected location relative to the hydrogel region and the microfluidic conduit. The localized environment can include a hydrogel structure configured to simulate at least one of a wound, inflammatory swelling, or a tumor.

The permeable hydrogel may be fluorescently labeled to contrast with a florescence-labeled particle contained in a fluid to be delivered into at least one of the fluid inlets. The perfusive tissue phantom can also include a plurality of microparticles or nanoparticles mixed with the permeable hydrogel and configured to react in a predictable and detectable manner to an activation trigger delivered into at least one of the fluid inlets.

The chamber may include a pair of electrodes to measure electrical characteristics of the permeable hydrogel. The permeable hydrogel may be configured to receive a plurality of electrically conductive particles for electrical detection and tracking of fluidic movement via the pair of electrodes.

According to various embodiments there is provided a method of constructing a perfusive tissue phantom. The method includes disposing a hydrogel layer within a chamber comprising fluid inlets disposed in a first portion and fluid outlets disposed in a second portion spaced apart from the first portion. The hydrogel layer is connected to at least one of the fluid inlets and includes a permeable hydrogel with structural characteristics that simulate a type of tissue. The method also includes disposing a microfluidic conduit with the hydrogel layer. The microfluidic conduit is coupled to at least one of the fluid inlets and is a flexible, semi-permeable fiber that simulates a blood vessel.

The hydrogel region may be a first hydrogel region, and the method may include disposing a second hydrogel layer in the chamber connected with at least a different one of the fluid inlets. The second hydrogel layer includes a second permeable hydrogel with second structural characteristics different from the first structural characteristics. The second hydrogel layer is to simulate a second type of tissue with different flow characteristics compared to the first hydrogel layer.

The method may also include selecting a subset of the fluid inlets for introduction of fluid into the chamber. The spacing between the subset of the fluid inlets is selected to control a degree of fluid interaction between the first hydrogel layer and the second hydrogel layer.

The method may also include constructing a localized environment within the hydrogel layer at a selected location relative to the hydrogel layer and the microfluid conduit. The localized environment may include a hydrogel structure configured to simulate at least one of a wound, inflammatory swelling, or a tumor.

The permeable hydrogel may be fluorescently labeled to contrast with a florescence-labeled particle contained in a fluid to be delivered into at least one of the fluid inlets. The method may also include mixing a plurality of microparticles or nanoparticles with the permeable hydrogel. The microparticles or nanoparticles are configured to react in a predictable and detectable manner to an activation trigger delivered into at least one of the fluid inlets. The method may also include sealing the chamber to form a reversibly enclosed chamber.

According to various embodiments there is provided a perfusive tissue phantom chamber, which includes an enclosure, a fluid inlet disposed in a first portion of the enclosure and configured to receive a needle for injecting fluid into the enclosure, and a fluid outlet disposed in a second portion of the enclosure, spaced apart from the first portion, and including a pressure release valve to allow the fluid to exit the enclosure. The fluid inlet and fluid outlet are configured to be connectable to a permeable hydrogel to enable controlled perfusive flow of the fluid through the hydrogel from the inlet to the outlet.

The enclosure can include a sealable portion to form a reversibly enclosed chamber. The chamber can also include a microfluidic conduit coupled to the fluid inlet. The microfluidic conduit is a flexible, semi-permeable fiber that simulates a blood vessel. The enclosure can include a permeable hydrogel disposed in the enclosure and having structural characteristics that simulate a type of tissue.

BRIEF DESCRIPTION OF THE DRAWINGS

Example embodiments will now be described, by way of non-limiting example, with reference to the accompanying drawings, in which.

DETAILED DESCRIPTION

The present disclosure describes techniques for creating a perfusive tissue phantom that possesses the appropriate functionality, whether it is optical, bioelectrical, chemical or biological, etc. to be useful for the study of tissue of interest for a particular application. Some examples of these applications could be the study of how the tissue responds to a new drug and how chronic wound heals under different environments.

To improve the accuracy and usefulness of experimental studies, the tissue phantom described herein provides improved modeling of actual tissue and combinations of different tissue types. The tissue phantom enables researchers to perform biological experiments using a structure that more accurately resembles the actual physiology and flow characteristics of a biological environment.

The accurate modeling of tissue involves modeling the fluidic transport within the tissue, which is a very complex biological function that has often been overlooked in the area of tissue modeling. For this reason, the study of tissue for pharmaceutical or clinical investigations often relies on the use of live human samples or directly on the human themselves. Embodiments of the present techniques allow such complex fluid flows to be modeled, providing a more readily available resource for such experimentation.

There is constant fluidic exchange occurring in the tissue space anywhere in the body. One such tissue space is referred to as the interstitial fluid space (IFS) or interstitium. The interstitium is a complex and dynamic region composed predominantly of a network of extracellular matrix proteins such as collagen, elastin, and glycosaminoglycans. Interstitial fluid resides within this network, transporting metabolites and electrolytes to tissues, muscle cells, cartilage, bone cells, organs and other cell groups.

The interstitium includes a support substance that includes the extracellular matrix and free water. Together with collagen fibers, the extracellular matrix maintains structural integrity of the tissue. Other elements such as the proteoglycan filaments in interstitial fluid space form a network that promote resistance to free flow of fluid, providing controlled diffusion of liquid. To elaborate further, the body fluid contents are broadly categorized either as extracellular fluid (i.e. the fluid surrounding all of the cells in the body), or intracellular fluid (i.e. the fluid contained within the cells in the body). Interstitial fluid, along with plasma, makes up the extracellular fluid environment. For a healthy tissue, 10-20% of the excess interstitial fluid is drained by the initial lymphatics and the rest is reabsorbed by the venous capillaries. Hence, the lymph formation and the lymph flow rate regulate the flow rate of interstitial fluid.

The interstitial fluid space has two basic forms, referred to herein as convective and passive. The convective form is directly connected with the blood vessels such that the vessels are in continuous exchange of fluid and nutrients with the interstitial fluid space. This form of interstitial fluid space exists as a parallel conduit form factor with rapid convective and perfusive flow characteristics. The passive form of interstitial fluid space exists more so in a passive state in contrast to the dynamic and active state of the convective flow form. The passive interstitial fluid space percolates through the surrounding cells and is an integrated part of the extracellular matrix, providing more close-up diffusive fluidic exchange with each individual cell unit. Fluid flow in the passive interstitial fluid space is relatively slower and more restricted.

The interstitial fluid flow maintains nutrition and body fluid metabolism. The entire process is balanced by the venous pressure, interstitium composition, interstitial pressure, and pressure inside lymphatic vessels. The interstitial flow through tissue has been found to facilitate protein transport, drug deliveries, and therapeutics. The present techniques enable the modeling of these various types of fluid flow for a better understanding of how various substances affect the tissue under test.

A perfusive tissue phantom in accordance with embodiments includes a chamber comprising fluid inlets disposed on a first side and fluid outlets disposed on a second side spaced apart from the first side. The chamber may be filled with one or more hydrogel regions connected to the fluid inlets and fluid outlets. Each hydrogel region includes a permeable hydrogel with structural characteristics that simulate a type of tissue and can include convective interstitial fluid space and passive interstitial fluid space. To simulate blood vessels, the chamber can include one or more three-dimensional microfluidic conduits coupled to the fluid inlets. The microfluidic conduits are flexible, semi-permeable fibers that can be used to simulate various types of blood vessels, including capillaries, veins, and arteries.

During testing, various types of fluid may be introduced to the fluid inlets in a controlled manner and allowed to flow through the chamber to the fluid outlets to create an accurate simulation of the types of fluid flow in actual tissue. A variety of monitoring mechanisms may be used to determine how the fluid is moving within the tissue phantom and track changes in the tissue phantom without interfering with the simulated functions of the tissue. The chamber can also be configured to a reusable form or can be customized to fit the specifications of a particular experiment.

Figure 1:
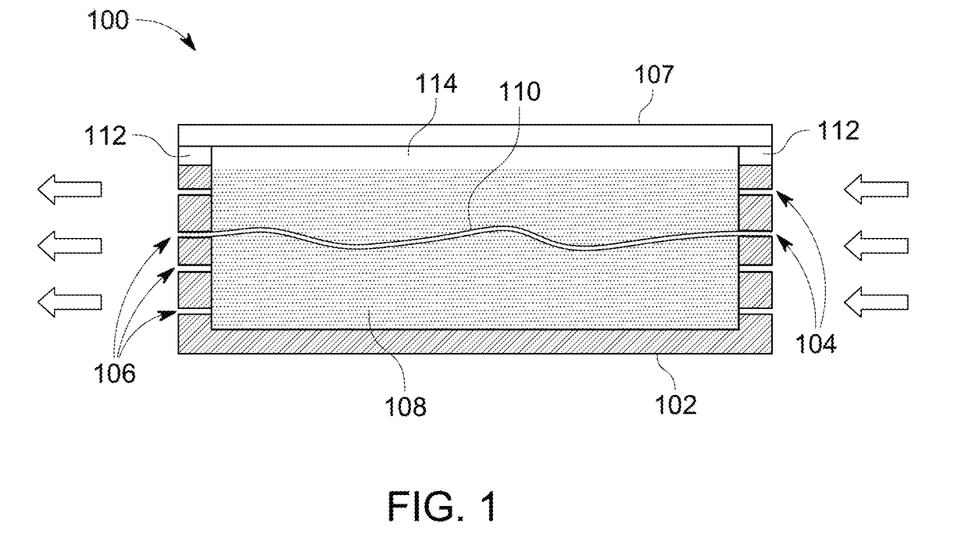
FIG. 1 is a cross-sectional view of a perfusive tissue phantom in accordance with embodiments.

FIG. 1 is a cross-sectional view of a perfusive tissue phantom in accordance with embodiments. The perfusive tissue phantom 100 includes a chamber 102 which defines fluidic inputs and fluidic outputs of the tissue phantom, and also defines the boundary conditions and viewing mechanism. The example chamber 102 includes fluid inlets 104 and fluid outlets 106, which are described further below. The chamber 102 is shown in FIG. 1 as a rectangular box-shaped enclosure with four side walls, a bottom surface, and a top surface. However, the chamber 102 can be any suitable shape, including cylindrical, spheroidal, oblong, and others. The chamber 102 may be made of any suitable material, including glass, polymers, and others. In some embodiments, the top surface of the chamber 102 may be implemented as a temporary sealable cover 107, as described further below.

The perfusive tissue phantom includes a permeable hydrogel 108 that fills the chamber 102 and serves as an artificial network that resembles the structural function of the interstitium of the tissue. The interstitium is composed of structural elements that give the tissue its shape, rigidity, and consistency. The hydrogel 108 may include a combination of various ingredients such as agarose, poly(ethylene glycol) diacrylate (PEGDA), and chitosan configured to simulate the structural elements of a particular type of tissue. The percentage of weight volume and final concentrations of these and other additives may be controlled to create a network with desired structural characteristics such as porosity, density, shape, and rigidity. The structural characteristics may be controlled to simulate a specific type of tissue environment of interest by controlling the formulation of the hydrogel contents, and their pre-mixture and final mixture percentage as well as additives.

Some examples of biologically-derived materials that may be used to generate the permeable hydrogel include chitosan, collagen, agarose, alginate, dextran, gelatin, fibrin, albumin, glycosaminoglycans, fibronectin, laminin, hyaluronan, and biological cells (e.g. fibroblasts, stem cells). Examples of synthetic materials that may be used to generate the permeable hydrogel include polystyrene, polyacrylamide, polymethylmethacrylate, polyethylene glycol, poly(lactic acid), poly(glycolic acid), poly(lactide-co-glycolic acid), poly(N-isopropylacrylamide), poly(ε-caprolactone), and poly(3-hydroxybutyrate-co-3-hydroxyvalerate). The above-mentioned materials may be obtained in powdered form and dissolved in water or other solvents to make a solution. The materials dissolved in the solution can then be crosslinked to form a gel-like semi-solid structure. Crosslinking may be performed, for example, by introducing a chemical gelling agent (chemical crosslinking), exposing the solution to light (photo-crosslinking), or altering the temperature. Since the material is dissolved in solution, the resulting gel can be molded into any shape prior to inducing gelation. As one example, a 1% weight to volume agarose hydrogel having a predetermined molecular lattice shape and structures, and an approximate porosity in the range of 200-500 nanometers can be formed. The rigidity of the gel can also be controlled by tuning the weight percentage per given volume.

The tissue phantom 100 can also include one or microfluidic conduits 110 coupled to one or more fluid inlets 104. The microfluidic conduit 110 is a flexible, semi-permeable fiber that simulates a blood vessel, such as a capillary, vein or artery. Although a single microfluidic conduit 110 is shown, an actual tissue phantom in accordance with embodiments may include several microfluidic conduits 110 of one or more sizes to more accurately simulate an actual tissue environment. The flexibility and permeability allows the microfluidic conduit 110 to more closely model the functions of an actual blood vessel. For example, fluid introduced into the microfluidic conduit 110 can permeate the walls of the conduit into the surrounding hydrogel 108 in much the same way blood permeated capillary walls into the interstitium. The porosity of the microfluidic conduit can be controlled to provide a desired exchange gradient that simulates a specific type of blood vessel.

Microfluidic conduits 110 can be constructed by employing a microfluidic manufacturing approach in which biocompatible gelation ingredients are fed into a fiber-forming microfluidic channel with multiple inputs at one end and a single output at the opposite end. The inputs can include a single middle channel surrounded by multiple outer channels. A selected gelatin can be injected into the outer channels to form the conduit walls while a neural fluid is injected into the middle channel, resulting in a hollow fiber being excreted at the output. This hollow fiber is flexible, robust, and semi-permeable and can be pulled out of the fiber-forming microfluidic channel using a tweezer. The hollow fiber can then be implanted into the phantom interstitium, i.e. the permeable hydrogel, and coupled to one of the inlets. Similar to the artificial interstitium, the composition of the microfluidic channel can be tuned by altering the fiber-formation ingredient mixture ratio, for example, the amount of agarose to the amount of water in a final mixture solution.

As an example, microfluidic conduits can be fabricated using alginate with its curing agent calcium chloride starting in their original powder form and processed to form a semi-permeable micro-tubular structure with a hollow inner core that can be used for fluidic transport. The example process can be performed using a microfluidic device having five inlets. The five inlets include a pair of side outer inlets, a pair of side inner inlets sandwiched between the side outer inlets, and a center inlet at the middle. The rnicrofluidic device in this example also includes a single outlet coupled to the five inlets. Three dedicated microfluidic pumps are used to control the perfusion of the synthesis solution and may be coupled to the inlets via blunt-tip, 30-gauge syringe needles. One of the pumps is connected to the outer inlets, one is coupled to the inner inlets, and one is coupled to the center inlet, Three types of pre-polymer solutions are used in this example embodiment: an alginate mixture, a curing solution, and a buffer solution, Each solution may be loaded within a 20-ml, 20-ml, and 10-ml syringe, respectively. To synthesize the gelation of a 2% weight-to-volume solution of a high G-content alginate (65-75% G), 0.4 grams of alginate powder is dispensed into a vial containing 20 milliliters of deionized water. After mixing at 1000 rpm on a mechanical shaker and 30 seconds in a sonicator at 40 Hz, 80W power, the fully dissolved alginate mixture is loaded into the outer inlets syringe. Next, a 75 millimeter solution of calcium chloride solution is prepared by weighing 0.166 grams of the calcium chloride powder having 110.98 grams per mole of molecular weight and dissolved in 20 ml of deionized water, After mixing at 1000 rpm and sonication at 40 Hz, 80W power, the final solution is loaded to the inner inlets syringe, and 10 milliliters of deionized water is loaded into the center syringe. For a tubular structure with an outer diameter of approximately 100 micrometers and an inner diameter of approximately 80 micrometers, the microfluidic pump simultaneously actuates each of the syringes and perfuses the synthesis solutions at a flow rate of 60 microliters per minute, 40 microliters per minute, and 30 microliters per minute, respectively to outer inlets, inner inlets, and center inlet. The flow rates may be dynamically adjusted to fine tune the diameter to precision. Due to rapid chemical interaction at the laminar fluidic interface between alginate and its curing agent calcium chloride, solidification is established to form a semi-permeable gel at predetermined 2% structure rigidity with a thickened inner diameter wall of approximately 20 micrometers. The final tubular structure is hydrodynamically extruded from the microfluidic channel at the outlet, fully cured, and can be deployed within the tissue phantom 100.

It will be appreciated that the specific process described above is one example for fabricating microfluidic conduits 110. Various changes may be made to the process, materials, and material concentrations, depending on the desired physical characteristics. The physical characteristics of the fiber, such as rigidity, size, and porosity can be tuned to mimic blood vessels of different anatomical locations in the body.

The chamber's fluid inlets 104 are disposed on a first portion the chamber wall and the fluid outlets 106 are disposed on a second portion of the chamber wall spaced apart from the first portion such that fluid injected into the fluid inlets 104 flows through the tissue phantom 100. In the embodiment shown in FIG. 1, the fluid inlets 104 are shown on the right side of the chamber 102 and the fluid outlets 106 are shown on the opposite side of the chamber 102. However, it will be appreciated that other arrangements are also possible. Additionally, although a single line of fluid inlets 104 is shown, the fluid inlets 104 and outlets 106 may be arranged in a 2-dimensional array on their respective surfaces. The fluid inlets 104 may be configured to receive the insertion of blunt needles of various gauge sizes depending on the scale of output flux density desired.

One or more fluid inlets 104 may be coupled to the permeable hydrogel 108 to simulate interstitial fluid flow from neighboring tissue. Each of the microfluidic conduits 110 may also be coupled to one of the inlets 104 through a needle suitable for the inside diameter of the conduit. For example, a 30-gauge blunt needle may be used in the case of a microfluidic conduit configured to simulate a capillary.

Each of the inlets 104 may be connected externally to a pressure-controlled fluid delivery device that supplies desired flow rates for each inlet. Each inlet 104 may receive a specified type of fluid from the fluid delivery device, which may be different for different inputs. The outputs 106 on the chamber are pressure-relieving ports, to allow excess fluids to drain and leave the tissue phantom 100 in order to maintain proper pressurization and flow in the tissue phantom 100. The outputs 106 may include valves on the outside to provide a desired level of pressure release.

In some embodiments, the chamber 102 is reversibly enclosed with a temporary sealable opening so that the contents and constituents of the tissue phantom 100 can be changed at any time, for example, during an experiment or between experiments. The top side of the chamber 102 can remain open while the contents of the chamber 102 are being introduced. Once the chamber 102 is filled, a temporary cover 107, such as a glass plate, can be placed over the top after applying a layer of silicone-based sealant 112 to prevent fluidic leakage. A layer of padding liquid 114 may also be added to the chamber 102 to slightly overfill the top of the chamber 102 to prevent air-bubble formation. During testing, the cover 107 will be coupled to the chamber by the removable sealant.

The user may access the contents of the tissue phantom 100 by removing the top cover 107, which enables the user to make changes to the artificial interstitium and blood vessels, as well as remove excessive fluids or debris or obstructions. Access to the tissue phantom contents also enables the user to change the makeup of the tissue phantom 100 by adding additional hydrogel regions or other fluids or structures, such as particles, sensors, and others. The reversibility of the seal may be useful, for example, if selective or local damages are made to the tissue phantom 100; it gives the user the option of emptying the contents and reusing the chamber 102 and its connected inputs and outputs to start over without changing to a different system. If the chamber 102 is affixed to external monitoring apparatus such as microscope, exchanging the chamber 102 entirely would mean starting the experimental setup altogether, which can cause time and effort. With reversible design, user can simply add or eliminate unwanted contents on the fly, which greatly enhances the speed and convenience of experiments.

Figure 2:
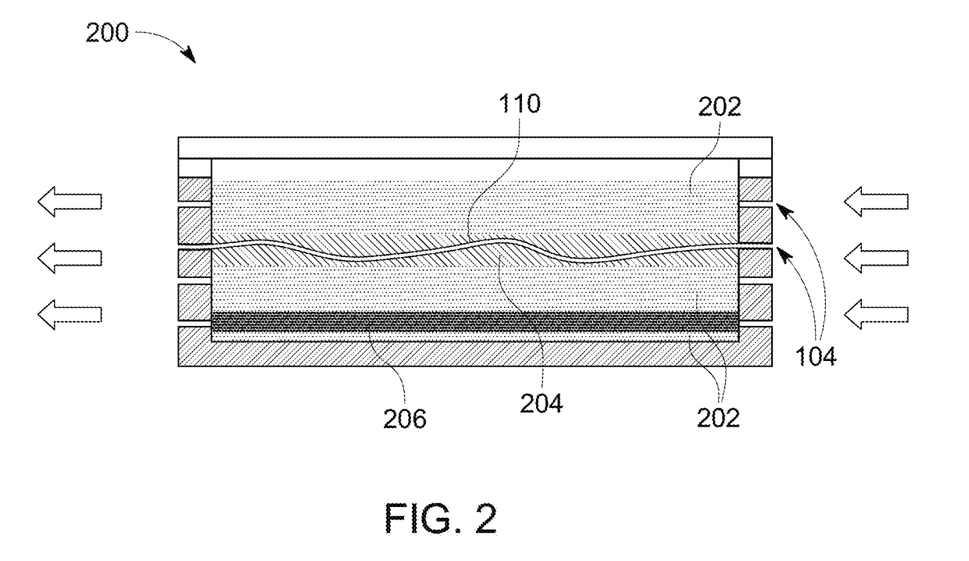
FIG. 2 is a cross-sectional view of a perfusive tissue phantom with multiple hydrogel regions in accordance with embodiments.

FIG. 2 is a cross-sectional view of a perfusive tissue phantom with multiple hydrogel regions in accordance with embodiments. The chamber shown in FIG. 2 is the same as the chamber shown in FIG. 1. However, in this embodiment, the chamber contents include a plurality of hydrogel regions with different structural characteristics. Each hydrogel region may be configured to simulate a different type of tissue.

In some embodiments, the hydrogel regions are deposited into the chamber 102 using a layer-by-layer deposition technique, with specific protocols applied to each type of hydrogel mixture to obtain the desired characteristics for each hydrogel region. The deposition of the hydrogel layers into the chamber 102 can be controlled to ensure that each layer deposition fuses with other hydrogel matrix or blood vessel structures to form an integrated network. For example, the temperature of the tissue phantom may be controlled to maintain a suitable level of fluidity that enables fusion of the hydrogel layers during their formation. An agarose-based hydrogel matrix can maintain fluidity at temperatures of at least 80 degrees Celsius. A rapid cooling process can be implemented to finalize the fusion of the deposited layers. Specific protocols may be devised for each type of hydrogel according to the type of interstitium and vessels to be simulated.

The various hydrogel regions may also be formed separately and then deposited into the chamber 102. Once the hydrogel regions are deposited, a temperature-controlled heating and cooling process may be implemented to ensure that each layer deposition fuses with other hydrogel matrix or blood vessel structures.

In the embodiment shown in FIG. 2, the tissue phantom includes five hydrogel regions. However, any number of hydrogel regions may be implemented depending on the design of a specific experiment. As an example, the tissue phantom 200 includes three diffusive hydrogel regions 202 configured to simulate a passive interstitial fluid space, such as the interstitial fluid space surrounding smooth muscle cells. Fluid injected through the inlets 104 or exuded from the microfluidic conduits 110 flow through these diffusive hydrogel regions 202 in a diffusive mode. The thickness of the layers can be controlled to determine the dampening of the convective flow force and the diffusive velocity by which fluid flows through the phantom. The thickness can be maintained using the layer-by-layer gel matrix deposition method described above.

The tissue phantom 200 may also include a convective hydrogel region 204 configured to simulate convective interstitial fluid space. The convective hydrogel region 204 may be configured to have greater porosity to enable faster fluid flows compared to the diffusive hydrogel regions 202. Convection is the dominant mode of flow when fluid exchange occurs from the blood vessels. As fluid flows through the blood vessels at a high rate, the pores on the blood vessels allow the passage of liquid molecules through the inter-cellular space of the blood vessel into the surrounding interstitium. To simulate these phenomena, the microfluidic conduits 110 can be perfused with prescribed flow rates that closely resemble the velocity matching physiological standards. Additionally, the porosity of the conduits 110 may be pre-determined during the manufacturing stage to closely resemble the porosity found in the type of blood vessels being simulated. This is a tunable parameter which can be experimentally fine-adjusted to mimic the real tissue characteristics. The microfluidic conduits 110 may be disposed in the convective hydrogel region 204, as shown in FIG. 2, or in different hydrogel regions including the diffusive hydrogel regions 202. Additionally, the tissue phantom may also include convective hydrogel regions 204 without microfluidic conduits 110.

The tissue phantom 200 may also include a hydrogel region configured as a hydrogel under test 206. The hydrogel under test 206 is to simulate a tissue of interest and may be an intended destination of one or more fluid flows. The hydrogel under test 206 may be configured to simulate any type of tissue that may be of interest to the user, such as cancerous tumor, a wound, scar tissue, a fibroblast layer, and others.

Some or all of the hydrogel regions may be coupled to one or more of the fluid inlets 104, which may be arranged in a 2-dimensional array. During testing, each fluid inlet 104 may be perfused with a selected fluid prescribed at specific flow rates to simulate a particular type of fluid flow suitable for the connected hydrogel region. For example, fluid inlets coupled to the diffusive hydrogel regions can be controlled to simulate diffusive flow from neighboring tissues. In some diffusive hydrogel regions 202, additional fluid may be introduced to simulate an increased fluid flow rate due to inflammatory response.

Furthermore, the 2D array of fluid inlets 104 on the side of the phantom chamber 102 can also simulate upstream perfusion of interstitium flows from nearby connective tissue space or the introduction of extra fluid as a result of "inflammatory response" from the body, in which extra fluid flood into the affected area to swell. The inlets can simulate the flow rate, interactive pattern and scale of the fluid perfusion to the area of interest.

The degree of fluidic interaction between hydrogel regions can be controlled by setting the pitch of the 2-dimensional array of fluid inlets (i.e., the spacing between the fluid inlets 104). The pitch may be configured to either promote constructive fluidic interaction between hydrogel regions or minimize fluidic interference between hydrogel regions. For example, a stratified flow style can be simulated by having two fluid inlets sufficiently spaced apart at defined flow rates to perfuse in parallel on top of each other. A chaotic flow style at various degrees of mixing can be simulated by using multiple inlets at close pitch or two inlets at high flow rates.

Figure 3:
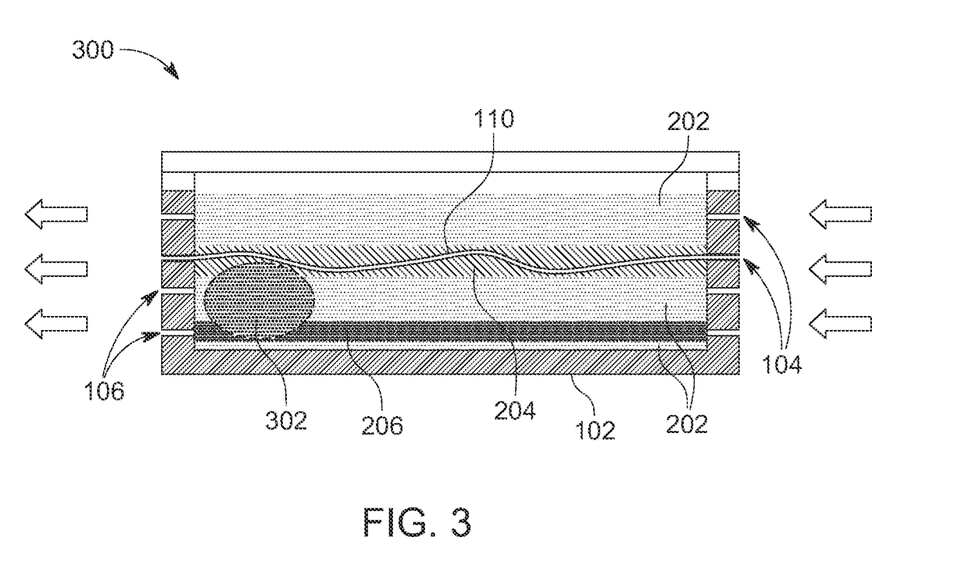
FIG. 3 is a cross-sectional view of a perfusive tissue phantom localized environment in accordance with embodiments.

FIG. 3 is a cross-sectional view of a perfusive tissue phantom localized environment in accordance with embodiments. The tissue phantom 300 shown in FIG. 3 is the same as the tissue phantom in FIG. 2 and includes the same chamber 102 and several of the same hydrogel regions. However, in this embodiment, the chamber contents also include a localized environment 302 constructed within the tissue phantom 300 at a selected location relative to the hydrogel regions and the microfluidic conduits 110. The localized environment 302 may be a hydrogel structure with structural characteristics that simulate damaged or diseased tissue such as a wound, inflammatory swelling, or a tumor, for example.

The localized environment 302 can be structured to simulate an accumulation of fluids such as may occur in the event of swelling due to a deep chronic wound or internal bleeding. Such a localized environment may be used to simulate the redirection of elements from nearby blood vessels and interstitium, such as extracellular matrix, structural proteins and inflammatory agents. The localized environment 302 may be formed by depositing a selected hydrogel ingredient to form, for example, a fluid retention bubble positioned at a desired location relative to the microfluidic conduits 110 and other hydrogel regions. Structural characteristics of the localized environment 302 can be altered using an instrument such as micro-tweezers. The localized environment 302 can either be pre-formed and deposited during the formation of the tissue phantom 300 or may be formed in-situ using a micro-pipette, for example. The localized environment 302 can be formed in-situ without damaging the overall integrity of the tissue phantom 300. As shown in FIG. 3, the localized environment 302 may be positioned such that it does not directly contact any of the fluid inlets 104 or outlets 106.

Figure 4:
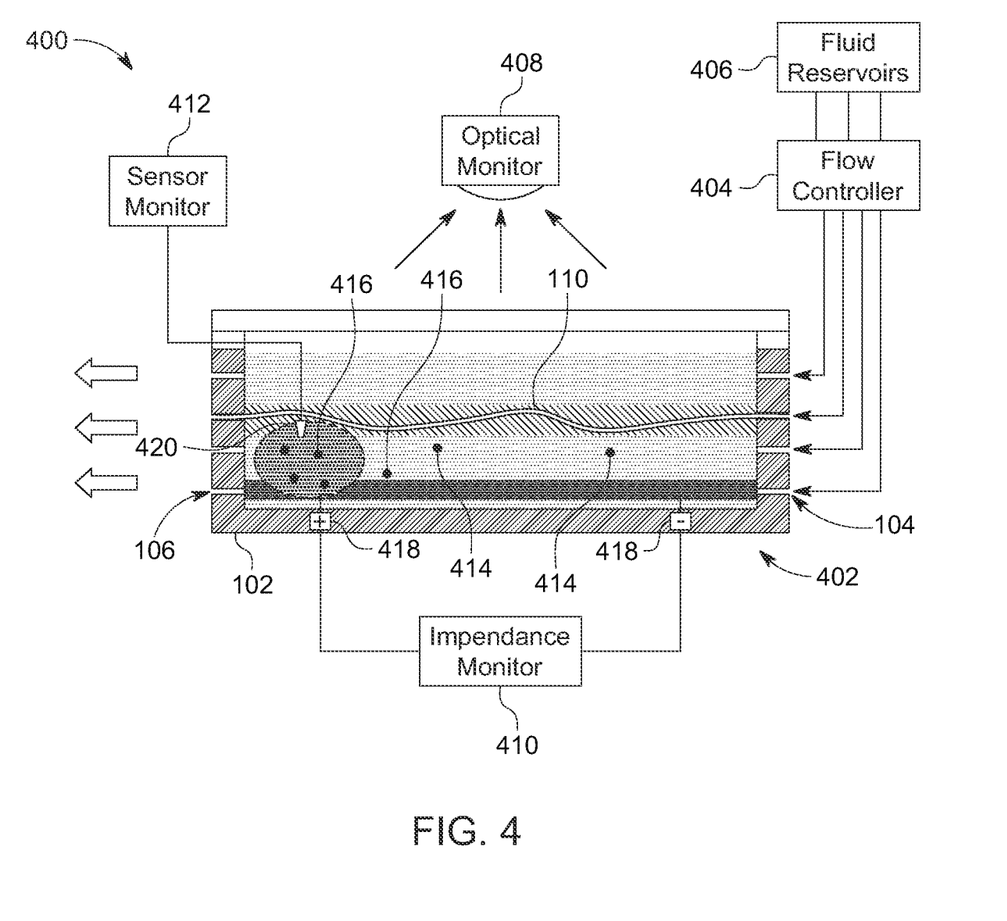
FIG. 4 is a block diagram of a testing system that may be used to implement various monitoring techniques in accordance with embodiments.

FIG. 4 is a block diagram of a testing system that may be used to implement various monitoring techniques in accordance with embodiments. The testing system 400 is configured to monitor flow characteristics through the tissue phantom 402, which may have the same hydrogel regions as the tissue phantom 300 shown in FIG. 3. However, it will be appreciated that the testing system 400 and the monitoring techniques described herein can apply to various other tissue phantom configurations.

The testing system 400 includes a flow controller 404 coupled to the fluid inlets 104. The flow controller 404 may include or be coupled to one or more fluid reservoirs 406 that hold the fluids to be injected into the tissue phantom 402. The flow controller 404 controls the fluid pressure and flow rate to be applied to each of the fluid inlets 104. The injected fluids perfuse through the tissue phantom 402 and are excreted at the fluid outlets 106.

The system 400 can also include one or more monitors, including an optical monitor 408, an impedance monitor 410, and one or more sensor monitors 412. Although all three monitor types are shown, it will be appreciated that a test system in accordance with embodiments may include one type of monitor or any suitable combination of monitors, including the depicted monitors or other types of monitors. While the fluid is travelling through the tissue phantom 402 or after a suitable time period after fluid injection begins, one or more of the monitors 408 may be engaged to determine the fluid flow characteristics.

The optical monitor 408 can be used to track the flow of particles in the fluid and may be any type of microscope such as a fluorescence microscope or a simple inverted microscope. The particles 414 may be nanoparticles (nanometer scale) or microparticles (micrometer scale), for example.

The particles are small enough that they can be dissolved or suspended in the fluid and carried by the fluid through the microfluidic conduits 110 and/or hydrogel regions 202 204 206 similar to red blood cells being carried by blood vessels and tissue of the body. In some embodiments, the particles 414 are tagged with a specific fluorescent label so that they can be remotely imaged using the optical monitor 408. The tagged particles may be infused with the fluid injected into the fluid inlets 104 and allowed to flow with the fluid through the tissue phantom 402. The fluorescence of florescent label may be activated by incident light from the optical monitor 408. Under this light, the tagged particles will light up, displaying their flow paths and trajectory as they are being perfused throughout the tissue phantom 402.

The hydrogel regions 202 204 206 may also be fluorescently labeled, to provide additional contrast to the moving fluid. For example, the perfusive fluid can be labeled with one type fluorescence tag, while the hydrogel regions in the tissue space are labeled with another contrasting tag, therefore providing a background in which both fluid and background structure can be illuminated to enhance differentiation.

The behavior of the fluids can also be tracked chemically through the use of the optical monitor 408. This can be done by implanting small stimuli-sensitive particles 416 throughout the tissue phantom 402 or at selected locations of interest. The stimuli-sensitive particles 416 may be microscale or nanoscale sized particles configured to react to a chemical activation trigger in a manner visible through the optical monitor 408. For example, the chemical trigger may cause the particles 416 to increase or decrease in size, undergo a change in optical properties (e.g. refractive index) or dissolve. One or more of the fluids injected into the tissue phantom 402 through the fluid inlets 104 can include the chemical activation trigger. Observation of the particles through the optical monitor 408, which may be a simple inverted microscope in this embodiment, indicates the behaviors of the particles 416, which reveals where the perfusing fluids are and how they are progressing through the tissue phantom 402 (also the contact time (interval, duration of contact with the particles) and the extent of contact (to what degree, at how high of an intensity the trigger reaches the particle for how much of an activation).

The impedance monitor 410 can be used to track the flow of electrically conductive particles in the fluid. The chamber 102 may be equipped with fluidic sensing elements such as planar electrodes 418, for example. The electrodes 418 may be disposed on a bottom side of the chamber 102 as shown in FIG. 4. The conductive particles may be electrolytically conductive filaments with a small physical size, for example, nanoscale or microscale dimensions. The conductive particles may be included in one or more of the fluids injected into the fluid inlets 104. As the conductive particles flow through the tissue phantom, the conductivity of the regions they occupy will increase. This increase in conductivity can be tracked by the impedance monitor 410 using electrical impedance tomography, a topological imaging method that maps out the distribution of electrically active elements in an electrolytically connecting space. By applying a pre-defined electrical current to the tissue phantom 402 through the electrodes 418 at consecutive cycles, a series of 2D images can be reconstructed to show the positions of the electrically conducting elements.

The sensor monitor 412 may be an electronic device configured to monitor signals received from one or more sensors 420 implanted in the tissue phantom 402. Sensors 420 may be implanted in a target area of the tissue phantom while the chamber 102 is open at the top. The sensors 420 may be any suitable type of sensors, including sensors configured to detect various types of biochemicals that may be present in the hydrogel regions. For example, a specific protein or small molecules may be included in the fluid injected into one or more of the fluid inlets. Detection of the biochemical by the sensor 420 may serve as an indication of the degree to which the biochemical is reaching a target area in the vicinity of the sensor 420.

Figure 5:
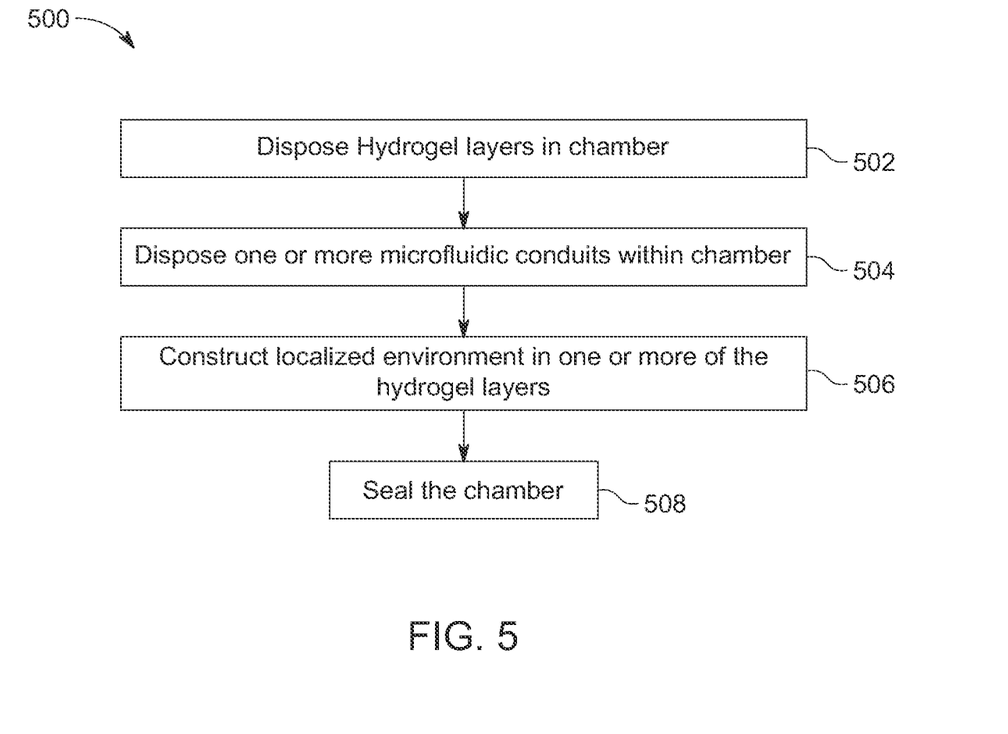
FIG. 5 is a process flow diagram illustrating an example method for fabricating a perfusive tissue phantom in accordance with embodiments.

FIG. 5 is a process flow diagram illustrating an example method for fabricating a perfusive tissue phantom in accordance with embodiments. It will be appreciated the processes shown in FIG. 5 may be performed in an order different from what is shown, and that the method 500 may also include fewer or additional processes depending on the design considerations of a particular embodiment. The method may begin at block 502.

At block 502, one or more hydrogel layers are disposed within a chamber. The chamber includes one or more fluid inlets disposed in a first portion and one or more fluid outlets disposed in a second portion spaced apart from the first portion. At least one or more of the hydrogel layers are fluidically connected to at least one of the fluid inlets. The hydrogel layers may be permeable hydrogels with structural characteristics that simulate specific types of tissue. The hydrogel layers may be fabricated in any of the manners described herein and may be fabricated inside the chamber or may be fabricated outside of the chamber and deposited in the chamber after fabrication.

Embodiments may include a single hydrogel layer or multiple hydrogel layers. For example, the layers may include a first hydrogel region with structural characteristics that simulate a first type of tissue and a second hydrogel layer with second structural characteristics to simulate a second type of tissue with different flow characteristics compared to the first hydrogel layer. Additional hydrogel layers can also be included.

In one or more of the hydrogel layers, the permeable hydrogel may be fluorescently labeled to contrast with a florescence-labeled particle contained in a fluid to be delivered into at least one of the fluid inlets. Additionally, microparticles and/or nanoparticles can be mixed with the permeable hydrogel of any of the hydrogel layers. These particles may be configured to react in a predictable and detectable manner to an activation trigger, such as a chemical activation trigger delivered into at least one of the fluid inlets.

At block 504, one or more microfluidic conduits are disposed in the chamber in relation to at least one the hydrogel layers. The microfluidic conduits are flexible, semi-permeable fibers that simulate blood vessels and are coupled to the fluid inlets. The microfluidic conduits may be fabricated in any of the manners described herein and added to the chamber at a selected location relative to the hydrogel layers. Additionally, the microfluidic conduits may be added to the chamber at any time during the fabrication of the tissue phantom before or after the addition of specific hydrogel layers.

At block 506, a localized environment is constructed in one or more of the hydrogel layers. The localized environment can include a hydrogel structure configured to simulate, for example, a wound, inflammatory swelling, a tumor, or others. The localized environment may be positioned at a selected location relative to the hydrogel layers and the microfluid conduits and may intersect multiple hydrogel regions. In embodiments, the localized environment may be formed by depositing a selected chemical or hydrogel ingredient into the hydrogel regions, by physically altering the hydrogel regions using an instrument such as micro-tweezers, or depositing a new pre-fabricated hydrogel region into the chamber, for example.

The localized environment may or may not be fluidically coupled to any of the fluid inlets or the fluid outlets. In some cases, depending on the design of a particular embodiment, block 506 may be eliminated and the localized environment not included.

At block 508, the chamber is sealed as described above. For example, a clear glass plate may be disposed over the chamber and coupled with a removable sealant to form a reversibly enclosed chamber. The sealing of the chamber can be performed to enable a pressurized and enclosed environment or a test to be performed or to facilitate handling, such as packaging or transportation.

The process described above enables the fabrication of various types of tissue phantoms useful for experimentation by researchers. The process is flexible and allows changes to be made to the tissue phantom at any time, and allows researchers to customize the tissue phantom to suit needs. The researcher could purchase a base tissue phantom with a limited number of prefabricated components, such as a single hydrogel layer with several microfluidic conduits, and add additional hydrogel layers or structures to fit the design of a specific experiment. A base tissue phantom may be a tissue phantom in accordance with any of the embodiments described in relation to FIGS. 1-3. The chamber can also be reconfigured and reused for multiple experiments having different hydrogel configurations.

The techniques described herein can also be implemented in other types and combinations of circuitry. As used in this application, the term "circuitry" may refer to hardware-only circuit implementations or implementations that use a combination of hardware circuits and computer code, such as software or firmware. Hardware-only implementations may include implementations in analog or digital circuitry or a combination thereof. Implementations in a combination of hardware and computer code include at least one processor programmed with computer code stored to one or more non-transitory computer-readable media, which may be incorporated into the at least one processor or accessible by the at least one processor through a memory access interface.

It is to be understood that what is described above is what is presently considered the preferred embodiments. However, it should be noted that the description of the preferred embodiments is given by way of example only and that various modifications may be made without departing from the scope as defined by the appended claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example, features described in the preceding description may be used in combinations other than the combinations explicitly described above. Additionally, although functions have been described with reference to certain features, those functions may be performable by other features whether described or not. Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasize an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

While endeavoring in the foregoing specification to draw attention to those features believed to be of importance, it should be understood that the Applicant may seek protection via the claims in respect of any patentable feature or combination of features hereinbefore referred to and/or shown in the drawings whether or not emphasis has been placed thereon.

What is claimed is:

1. A perfusive tissue phantom comprising:
   a chamber comprising fluid inlets disposed on a first side and fluid outlets disposed on a second side spaced apart from the first side;
   a hydrogel region connected to at least one of the fluid inlets and comprising a permeable hydrogel with structural characteristics that simulate a type of tissue; and
   a microfluidic conduit coupled to at least one of the fluid inlets, wherein the microfluidic conduit comprises a flexible, semi-permeable fiber that simulates a blood vessel.

2. The perfusive tissue phantom of claim 1, wherein the structural characteristics of the permeable hydrogel comprise a selected density, porosity, rigidity, and dimension that approximate a target density, porosity, rigidity, and dimension of interstitial space of the type of tissue.

3. The perfusive tissue phantom of claim 1, wherein the hydrogel region is a first hydrogel region, the perfusive tissue phantom comprising a second hydrogel region comprising a second permeable hydrogel with second structural characteristics that simulate a second type of tissue with different structural characteristics compared to the first hydrogel region.

4. The perfusive tissue phantom of claim 3, wherein the second hydrogel region is connected to at least a different one of the fluid inlets compared to the first hydrogel region.

5. The perfusive tissue phantom of claim 4, wherein a spacing between the fluid inlets is configured to control a degree of fluid interaction between the first hydrogel region and the second hydrogel region.

6. The perfusive tissue phantom of claim 1, comprising a localized environment constructed within the hydrogel region at a selected location relative to the hydrogel region and the microfluidic conduit, wherein the localized environment comprises
a hydrogel structure configured to simulate at least one of a wound, inflammatory swelling, or a tumor.

7. The perfusive tissue phantom of claim 1, wherein the permeable hydrogel is fluorescently labeled to contrast with a florescence-labeled particle contained in a fluid to be delivered into at least one of the fluid inlets.

8. The perfusive tissue phantom of claim 1, comprising a plurality of microparticles or nanoparticles mixed with the permeable hydrogel and configured to react in a predictable and detectable manner to an activation trigger delivered into at least one of the fluid inlets.

9. The perfusive tissue phantom of claim 1, wherein the chamber comprises a pair of electrodes to measure electrical characteristics of the permeable hydrogel, and wherein the permeable hydrogel is configured to receive a plurality of electrically conductive particles for electrical detection and tracking of fluidic movement via the pair of electrodes.

10. A method of constructing a perfusive tissue phantom, comprising:
disposing a hydrogel layer within a chamber comprising fluid inlets disposed in a first portion and fluid outlets disposed in a second portion spaced apart from the first portion, wherein the hydrogel layer is connected to at least one of the fluid inlets and comprises a permeable hydrogel with structural characteristics that simulate a type of tissue; and
disposing a microfluidic conduit with the hydrogel layer, wherein the microfluidic conduit is coupled to at least one of the fluid inlets and comprises a flexible, semipermeable fiber that simulates a blood vessel.

11. The method of claim 10, wherein the hydrogel region is a first hydrogel region, the method comprising disposing a second hydrogel layer in the chamber connected with at least a different one of the fluid inlets, the second hydrogel layer comprising a second permeable hydrogel with second structural characteristics different from the first structural characteristics, wherein the second hydrogel layer is to simulate a second type of tissue with different flow characteristics compared to the first hydrogel layer.

12. The method of claim 10, comprising selecting a subset of the fluid inlets for introduction of fluid into the chamber, wherein a spacing between the subset of the fluid inlets is selected to control a degree of fluid interaction between the first hydrogel layer and the second hydrogel layer.

13. The method of claim 10, comprising constructing a localized environment within the hydrogel layer at a selected location relative to the hydrogel layer and the microfluid conduit, wherein the localized environment comprises a hydrogel structure configured to simulate at least one of a wound, inflammatory swelling, or a tumor.

14. The method of claim 10, wherein the permeable hydrogel is fluorescently labeled to contrast with a florescence-labeled particle contained in a fluid to be delivered into at least one of the fluid inlets.

15. The method of claim 10, comprising mixing a plurality of microparticles or nanoparticles with the permeable hydrogel, wherein the microparticles or nanoparticles are configured to react in a predictable and detectable manner to an activation trigger delivered into at least one of the fluid inlets.

16. The method of claim 10, comprising sealing the chamber to form a reversibly enclosed chamber.

17. A perfusive tissue phantom chamber, comprising:
an enclosure;
a fluid inlet disposed in a first portion of the enclosure and configured to receive a needle for injecting fluid into the enclosure;
a fluid outlet disposed in a second portion of the enclosure, spaced apart from the first portion, and comprising a pressure release valve to allow the fluid to exit the enclosure;
wherein the fluid inlet and fluid outlet are configured to be connectable to a permeable hydrogel to enable controlled perfusive flow of the fluid through the hydrogel from the inlet to the outlet.

18. The perfusive tissue phantom chamber of claim 17, wherein the enclosure comprises a sealable portion to form a reversibly enclosed chamber.

19. The perfusive tissue phantom chamber of claim 17, comprising a microfluidic conduit coupled to the fluid inlet, wherein the microfluidic conduit comprises a flexible, semipermeable fiber that simulates a blood vessel.

20. The perfusive tissue phantom chamber of claim 17, comprising a permeable hydrogel disposed in the enclosure and having structural characteristics that simulate a type of tissue.

* * * * *